(12) United States Patent
Andronaco

(10) Patent No.: US 10,240,706 B2
(45) Date of Patent: Mar. 26, 2019

(54) VENTING SYSTEM FOR LINED PIPE

(71) Applicant: Ethylene, LLC, Kentwood, MI (US)

(72) Inventor: Ronald V. Andronaco, Alto, MI (US)

(73) Assignee: ETHYLENE, LLC, Kentwood, MI (US)

( * ) Notice: Subject to any disclaimer, the term of this patent is extended or adjusted under 35 U.S.C. 154(b) by 28 days.

(21) Appl. No.: 15/241,102

(22) Filed: Aug. 19, 2016

(65) Prior Publication Data

US 2018/0051841 A1 Feb. 22, 2018

(51) Int. Cl.
*F16L 55/07* (2006.01)
*F16L 9/18* (2006.01)

(52) U.S. Cl.
CPC .............. *F16L 55/07* (2013.01); *F16L 9/18* (2013.01); *F16L 2201/30* (2013.01)

(58) Field of Classification Search
CPC .................................................. F16L 55/07
USPC ........................................................ 138/92
See application file for complete search history.

(56) References Cited

U.S. PATENT DOCUMENTS

| 3,148,896 A | 9/1964 | Chu | |
| 6,607,097 B2 * | 8/2003 | Savage | B65D 75/5877 220/62.12 |
| 7,080,667 B2 | 7/2006 | McIntyre | |

FOREIGN PATENT DOCUMENTS

DE 102013208624 A1 * 11/2014 .......... F16L 58/1009
WO WO2000/08368 2/2000

* cited by examiner

*Primary Examiner* — Craig M Schneider
*Assistant Examiner* — David R Deal
(74) *Attorney, Agent, or Firm* — Honigman LLP

(57) ABSTRACT

A venting system includes a vent for expelling gases that accumulate between a metal pipe and a plastic liner disposed within the metal pipe. The vent includes a base portion that is configured to be disposed between the plastic liner and a wall of the metal pipe. The base portion has at least one channel extending along the base portion to a central region of the base portion. The vent includes an exhaust portion that protrudes from the central region of the base portion and is adapted to extend through the wall of the metal pipe. The exhaust portion has a central passage that interconnects with the at least one channel of the base portion, such that the vent is configured to vent gases from an interface area between the plastic liner and the wall of the metal pipe to an exterior atmosphere outside the metal pipe.

6 Claims, 5 Drawing Sheets

VENTING SYSTEM FOR LINED PIPE

FIELD OF THE INVENTION

The present invention relates generally to the field of lined pipes, and more particularly to venting gases through a wall of a metal pipe having a plastic liner.

BACKGROUND OF THE INVENTION

Plastic liners are commonly used in pipes and conduits to provide a corrosion resistant interior surface to the pipes or conduits, which may comprise steel or other metal that is susceptible to corrosion, deterioration, or other undesirable affects in the presence of the substance carried by the pipe. It is also generally known that plastic liners can be permeable in the presence of some substances and environmental conditions, such that gases may migrate or permeate to an interface between the liner and the pipe and, over time, cause deterioration and damage to the liner and pipe. To release these gases, a hole may be drilled through a wall of the pipe without puncturing the liner. However, a hole in the metal pipe can be susceptible to corrosion and thus limit the release of the gases, among other issues.

SUMMARY OF THE INVENTION

The present invention provides a vent or venting apparatus or device or system for expelling or venting gases that permeate or migrate to an interface between a metal pipe and a plastic liner disposed within the metal pipe. The vent is inserted or otherwise arranged to extend through a hole in a wall of the metal pipe to position a receiving end or base portion of the vent at the interface of the metal pipe and the plastic liner and between the plastic liner and inner surface of the metal pipe. One or more channels are provided along the base portion of the vent for receiving the gases from the interface and transmitting the gases to a central passage of the vent that extends through the wall of the metal pipe and to an exterior atmosphere or venting pipe or tube outside the metal pipe. The base portion of the vent that is disposed in the interface may cause the plastic liner to deform slightly inward and create a spacing in the interface around the base portion, which may assist with drawing gases to the lower pressure area formed by the vent. The vent may comprise a polymeric material, such as polytetrafluoroethylene or Teflon material, to limit or substantially preclude the metal pipe from corroding or deteriorating around the hole occupied by the vent.

Optionally, the base portion may include a plurality of channels that extend radially on the base portion from an edge of the base portion to the central region of the base portion. Also, the central passage of the vent may be formed generally orthogonally relative to the plurality of channels and extend though the base and exhaust portions to interconnect with the plurality of channels at the central region of the base portion.

According to yet another aspect of the present invention, a method is provided for venting gases from between a metal pipe and a plastic liner disposed within the metal pipe. The method includes forming a hole in the wall of the metal pipe, without puncturing the plastic liner. The method also includes inserting a vent into the hole to position a base portion of the vent in an interface area between the plastic liner and the wall of the metal pipe and position an exhaust portion of the vent through the wall of the metal pipe. The base portion includes at least one channel extending along the base portion to a central region of the base portion for receiving gases from the interface area. The exhaust portion of the vent protrudes from a central region of the base portion and includes a central passage that interconnects with the at least one channel of the base portion, such that the exhaust portion receives gases from the at least one channel and vents the gases to an exterior atmosphere outside the metal pipe.

These and other objects, advantages, purposes and features of the present invention will become apparent upon review of the following specification in conjunction with the drawings.

DESCRIPTION OF THE PREFERRED EMBODIMENTS

Figure 1:
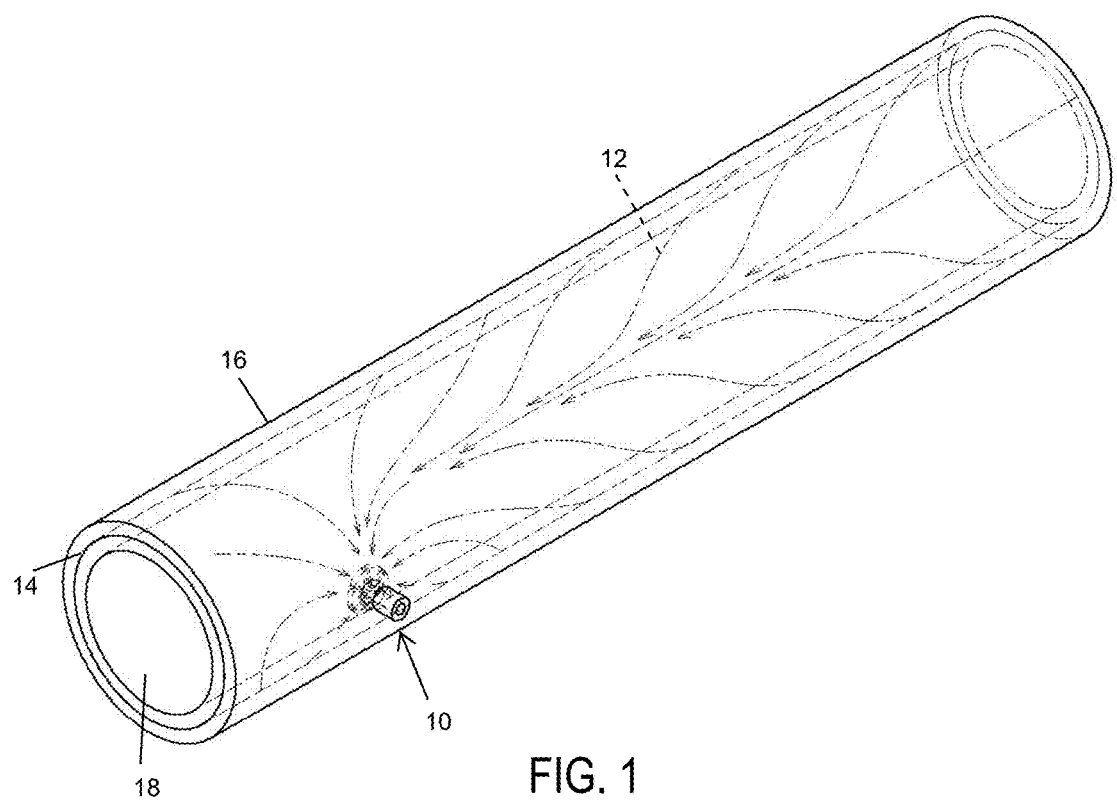
FIG. 1 is a perspective view of a pipe that has a vent extending through a wall of the pipe for venting gases from an interface between the pipe and a liner disposed within the pipe, where the gases being vented are shown with directional flow lines.
Figure 1A:
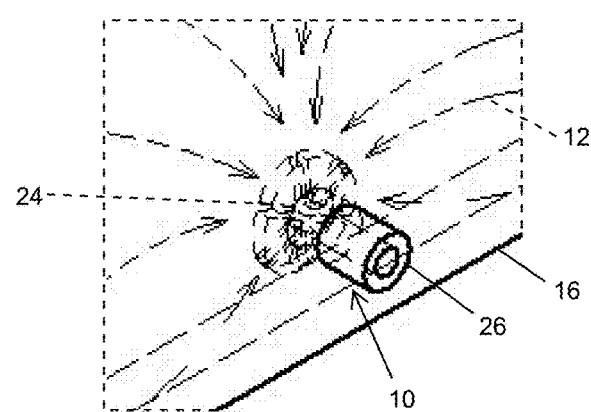
FIG. 1A is an enlarged section of the perspective view shown in FIG. 1.
Figure 2:
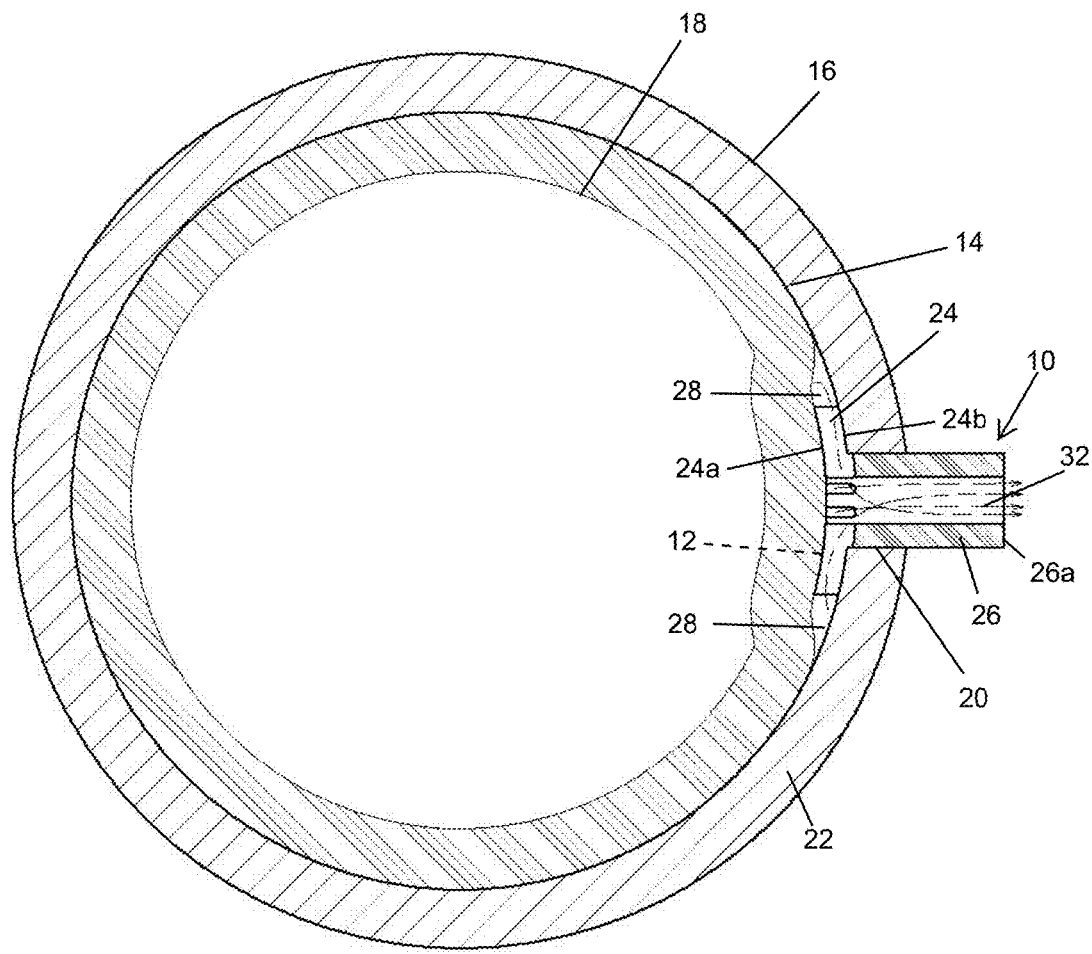
FIG. 2 is a cross-sectional view of the pipe and vent shown in FIG. 1, taken at a section orthogonal to a longitudinal extent of the pipe and also illustrating the gases being vented with directional flow lines.
Figure 3:
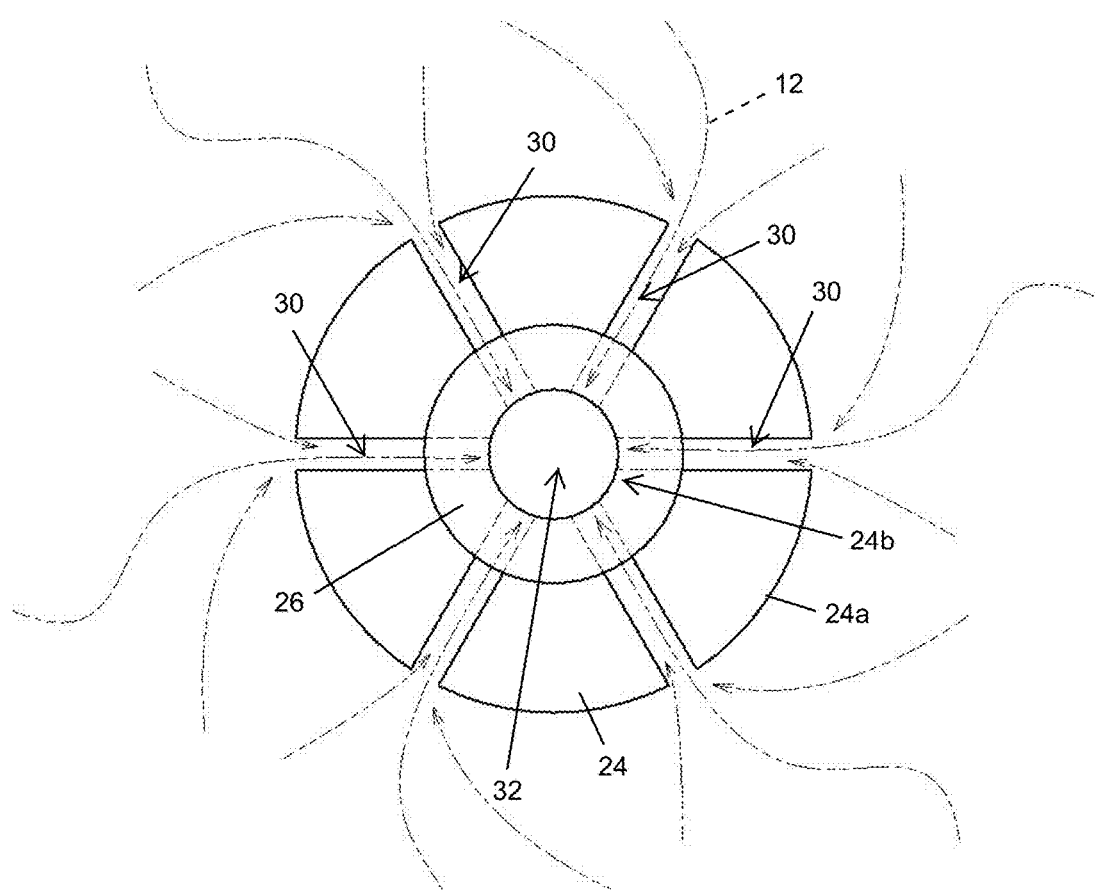
FIG. 3 is an end elevation view of the vent shown in FIG. 1, illustrating gases being vented with directional flow lines.

Referring now to the drawings and the illustrative embodiments depicted therein, a venting system provides a vent or venting apparatus or device 10 for expelling or venting gases 12 that permeate or migrate to an interface 14 between a metal pipe 16 and a plastic liner 18 that is disposed within the metal pipe 16 (FIGS. 1-3). Over time, these gases 12 may permeate from the substance flowing through the interior portion of the liner 18 radially outward through the plastic liner 18 to the interface 14 between the plastic liner 18 and the metal pipe 16. To release these gases, the vent 10 is inserted or otherwise arranged to extend through a hole 20 in a wall 22 of the metal pipe 16 (FIG. 2) and position a receiving end or base portion 24 of the vent 10 at the interface 14 of the metal pipe 16 and the plastic liner 18 and between the liner and inner surface of the pipe. A passageway, such as a channel or passage or the like, is provided to extend between the base portion 24 of the vent 10 and an opposing end or exhaust portion 26 of the vent 10 that extends through the wall 22 of the metal pipe 16 and to an exterior atmosphere or venting pipe or tube outside the metal pipe 16. It is contemplated that a single pipe may include multiple vents along the length of the pipe as desired for appropriate venting.

As shown in FIG. 2, the base portion 24 of the vent 10 is disposed within the interface 14 and causes the plastic liner 14 to deform slightly inward and create a spacing 28 in the interface 24 around the base portion 24, which may assist with drawing gases to the lower pressure area in the interface formed by the vent 10. The base portion 24 includes an inward-facing surface 24a that is configured to contact the liner 18 and an outward-facing surface 24b that is configured to contact the inner surface of the wall 22 of the metal pipe 16. The base portion 24 includes a thickness between the inward-facing and outward-facing surfaces 24a, 24b that is configured to separate the plastic liner 14 from the metal pipe 16 near the hole 20 in the metal pipe 16 and thus form the spacing 28 in the interface 14. Thus, the vent 10 is configured to form a low pressure area at the hole 20 in the wall 22 of the metal pipe 16 for drawing the gases out of the metal pipe 16.

In the illustrated embodiment, the base portion 24 is curved to generally correspond with the shape of the interior curvature or of the pipe 16. Optionally, the base portion 24 may be flexible and elastically deformable to adapt to the shape of the interior curvature or of the pipe 16. The base portion 24 may be held in this bent or flexed shape that corresponds with the interior shape of the pipe by the pressure provided by the substance contained inside the liner 18. It is also contemplated that the base portion 24 may be sufficiently rigid to maintain a generally planar or un-curved shape, and thus not correspond with the interior curvature of the pipe.

To hold the vent 10 in engagement with the metal pipe 16, the width of the base portion 24, which is the diameter of the illustrated base portion 24 extending generally across the inward-facing surface 24a (FIG. 4), is larger than the corresponding width or diameter of the exhaust portion 26. Specifically, the outward-facing surface 24b of the base portion 24 forms a shoulder for engaging the interior surface of the metal pipe 16, while the exhaust portion 26 extends through the hole 20 formed in wall 22 of the metal pipe 16. The hole 20 in the metal pipe 16 is formed, such as by drilling, so that it does not extend through or puncture the plastic liner 18, thereby maintaining the generally uninterrupted interior surface of the plastic liner 18.

The hole 20 in the metal pipe 16 can be susceptible to deterioration or corrosion in the presence of the gases, such as hydrogen chloride or hydrochloric acid, which permeate from certain substances carried by the interior portion of the plastic liner 18 and pipe. As such, the vent 10 may comprise a polymeric material, preferably comprising polytetrafluoroethylene or Teflon material, to prevent the metal pipe 16 from corroding or deteriorating around the hole 20 occupied by the vent 10. Also, and such as shown in FIGS. 1 and 2, the exhaust portion 26 has a length defined between the base portion 24 and the exterior end 26a, where the length extends radially through the wall 22 of the metal pipe 16 and protrudes a distance radially away from an external surface of the metal pipe 16. By spacing the end 26a of the exhaust portion 26 away from the external surface of the metal pipe 16, the potentially corrosive gases are expelled further away from the metal pipe 16 and thus have less of a chance of interacting with and corroding the metal pipe 16.

Figure 4:
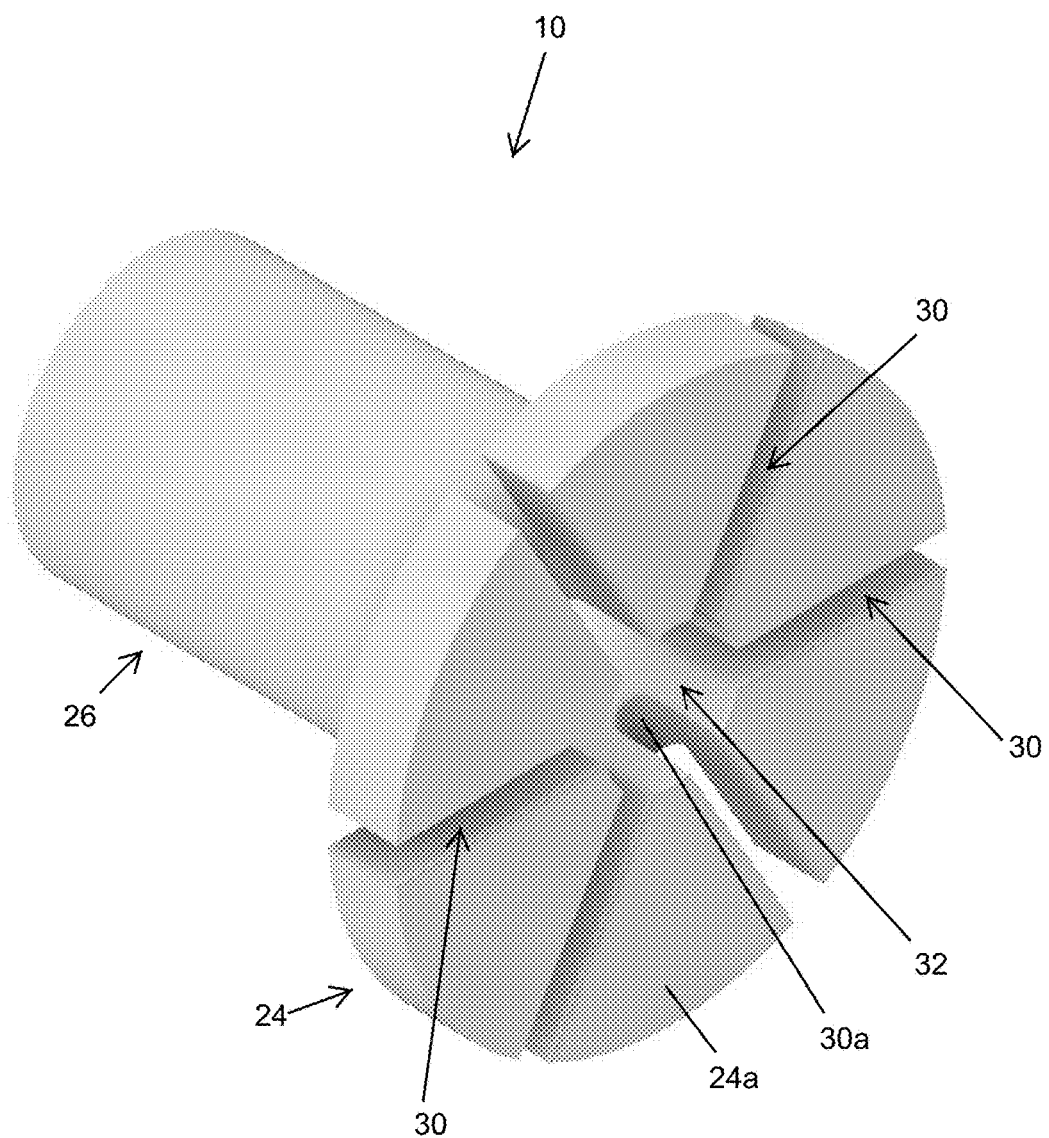
FIG. 4 is a perspective view of the vent of FIG. 1 separate from the pipe.
Figure 5:
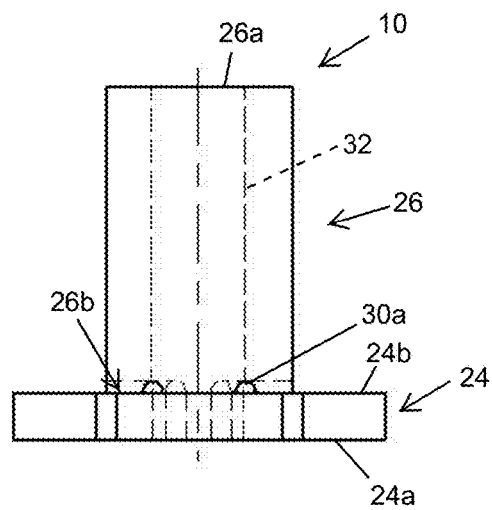
FIG. 5 is a side elevational view of the vent shown in FIG. 4.
Figure 6:
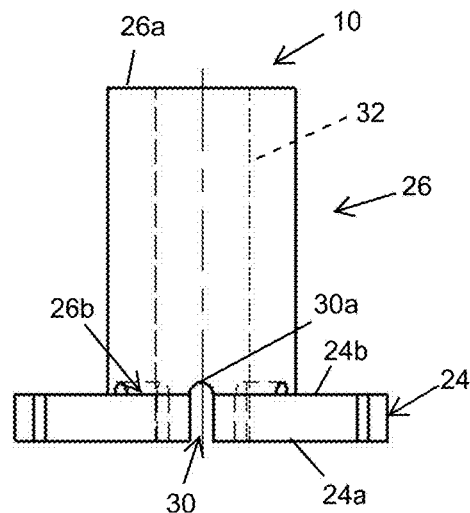
FIG. 6 is another side elevational view of the vent shown in FIG. 4, taken from a side orthogonal to the side shown in FIG. 5.
Figure 7:
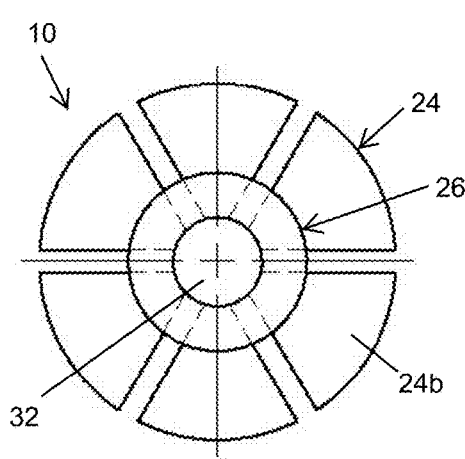
FIG. 7 is an end elevational view of the vent shown in FIG. 4.
Figure 8:
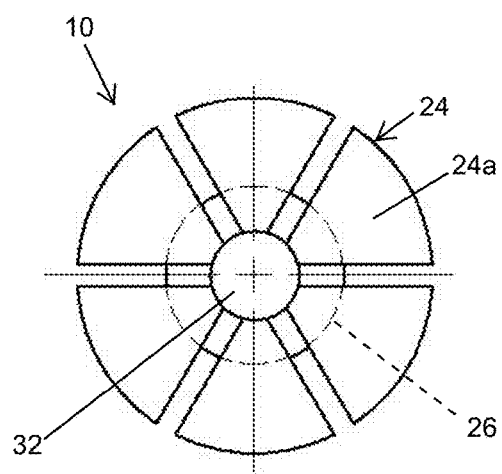
FIG. 8 is another end elevational view of the vent shown in FIG. 4, taken from an opposing end from the end shown in FIG. 7.

One or more channels or slots 30 are provided along the base portion 24 of the vent 10 for receiving the gases 12 from the interface 14 and transmitting the gases 12 to a central passage 32 of the vent 10 that extends along the exhaust portion 26 and through the wall 22 of the metal pipe 16. As shown for example in FIG. 3, a plurality of channels 30 extend radially along the base portion 24 from a peripheral edge 24a of the base portion 24 to a central region 24b of the base portion 24. The channels 30 may extend though the inward-facing surface 24a and/or the outward-facing surface 24b of the base portion 24, such as shown in FIG. 4, extending through the thickness of the base portion 24 between the inward-facing and outward-facing surfaces 24a, 24b. Optionally, the channels 30 may be provided between the edge 24a and the central region 24b without providing an opening along both or either the inward-facing or outward-facing surfaces 24a, 24b. Also, the channels 30 may be formed in various alternative shapes and arrangements, such as including more or fewer channels than the six radial channels 30 illustrated on the vent 10. As can be seen with reference to FIG. 4, by providing a plurality of channels (such as, for example, six channels) through the thickness of the base portion, the base portion comprises a plurality of separate wedge-shaped or fan-shaped or pie-shaped elements. Such a configuration may allow the separate elements to flex relative to the exhaust portion 26 so as to allow the base portion to generally conform to the shape or curvature of the inner surface of the pipe.

As shown in FIGS. 4-8, the illustrated exhaust portion 26 of the vent 10 includes a cylindrical shape with a circumferential exterior surface configured to engage around the peripheral edge of the hole 20 (FIG. 2) extending through the wall 22 of the metal pipe 16. The exhaust portion 26 includes the central passage 32 that extends generally linearly entirely though the vent 10, from the exterior end 26a of the exhaust portion 26 through the inward-facing surface 24a of the base portion 24. The central passage 32 may extend generally orthogonally relative to the channels 30 and interconnect with the channels 30 at the central region 24b of the base portion, such that gases from the spacing 28 or interface 14 between the plastic liner 18 and the metal pipe 16 may flow through the channels 30, through the central passage 32, and exit to the exterior atmosphere outside the metal pipe 16. Optionally, the central passage 32 may terminate prior to exiting the inward-face surface 24a of the base portion to still interconnect with the channels 30. Optionally, the central passage 32 may include more than one aperture and may be formed in various alternative shapes and arrangements. In the illustrated embodiment, the channels 30 each include a rounded internal portion 30a (FIGS. 4-6) that extends away from the base portion 24 slightly into the interior end 26b of the exhaust portion 26.

The vent may comprise a plastic element and may be inserted into the hole in the pipe from the inside of the pipe and before the liner is applied in the pipe. Optionally, the vent may be flexible or resilient to ease insertion into the pipe hole (and optionally the exhaust portion may be tapered and/or flexible to ease insertion through the hole from inside the pipe).

Optionally, the plastic element may comprise a flexible or elastomeric or resilient element that may flex or bend to assist in positioning the vent at and through the hole. It is envisioned that the vent may be sufficiently flexible to allow the base portion to flex or compress so as to be insertable through the hole in the pipe so that the vent can be installed in or at the hole from outside the pipe. For example, the rounded internal portions 30a may allow each divided pie-shaped element or section of the base portion 24 to resiliently flex inward about the interior end 26b of the exhaust portion 26. This inward flexing of each section of the base portion 24 temporarily may allow the width or diameter of the base portion 24 to be reduced for inserting the base portion 24 through the hole 20 that is drilled or otherwise formed in the metal pipe 16 when installing the vent 10. After inserting the base portion 24 of the vent 10 into the hole 20, the base portion 24 may resiliently move outward and generally return to its original width or diameter.

When installed at the pipe and liner (whether from the outside of the pipe or the inside of the pipe), the base portion 24 of the vent is positioned in the interface area 14 between the plastic liner 18 and the wall 22 of the metal pipe 16, which also causes the liner 18 to separate from the metal pipe 16 and form the spacing 28 around the base portion 24 to more readily receive the gases that permeate or migrate to the interface 14. The channels 30 extending along the base portion 24 receive the gases from the spacing 28 or interface area 14 and vent the gases 12 to the central passage, which further vents the gases along the exhaust portion 26 of the vent 10 to the exterior atmosphere outside the metal pipe 16 or to an optional venting pipe or tube that connects to the vent 10 outside of the metal pipe 16. Thus, the vent 10 removes the accumulating corrosive gases from the interface 14 and prevents the metal pipe 16 from corroding or deteriorating around the hole 20 occupied by the vent 20.

Changes and modifications in the specifically described embodiments may be carried out without departing from the principles of the present invention, which is intended to be limited only by the scope of the appended claims as interpreted according to the principles of patent law.

The invention claimed is:

1. A venting system for expelling gases that accumulate between a metal pipe and a plastic liner disposed within the metal pipe, said venting system comprising:
    a vent having (i) a base portion that is configured to be disposed between the plastic liner and a wall of the metal pipe and (ii) an exhaust portion that protrudes from a central region of said base portion and is configured to extend through the wall of the metal pipe;
    wherein said base portion has a thickness extending between an inward-facing surface of said base portion and an outward-facing surface of said base portion, and wherein said inward-facing surface is configured to contact the plastic liner when said base portion is disposed between the plastic liner and the wall of the metal pipe, and wherein said outward-facing surface is configured to contact the metal pipe when said base portion is disposed between the plastic liner and the wall of the metal pipe;
    wherein said base portion includes a plurality of channels extending through the entire thickness of said base portion from said inward-facing surface to said outward-facing surface, each of the channels extending radially on said base portion from an outer edge of said base portion to said central region of said base portion;
    wherein said vent includes a central passage that extends orthogonally relative to said plurality of channels and through said base portion and said exhaust portion to interconnect with said plurality of channels at said central region of said base portion;
    wherein said base portion comprises a plurality of pie-shaped elements separated from one another by respective ones of the plurality of channels; and
    wherein, with said base portion disposed between the plastic liner and the wall of the metal pipe, said vent allows for gases to flow from said outer edge of said base portion, along said channels and said central passage, through the wall of the metal pipe, and to an external end of said exhaust portion.

2. The venting system of claim 1, wherein, with said base portion disposed between the plastic liner and the wall of the metal pipe, the thickness of said base portion separates the plastic liner away from the metal pipe near a hole in the metal pipe through which said exhaust portion is received, and wherein said vent is configured to form a low pressure point at the hole in the wall of the metal pipe for drawing the gases out of the metal pipe.

3. The venting system of claim 1, wherein a first dimension of said base portion is larger than a corresponding second dimension of said exhaust portion, and wherein said second dimension is configured to span across a width of a hole through the wall of the metal pipe, and wherein the first dimension is greater than the width of the hole through the wall of the metal pipe.

4. The venting system of claim 1, wherein said vent comprises a single integral piece of polymer that comprises polytetrafluoroethylene.

5. The venting system of claim 1, wherein said exhaust portion comprises a length that is configured to protrude through the wall of the metal pipe and extend radially from an external surface of the metal pipe.

6. The venting system of claim 1, wherein said exhaust portion comprises a cylindrical shape with a circumferential exterior surface configured to engage a hole through the wall of the metal pipe, and wherein said base portion comprises a diameter that is larger than a diameter of said exhaust portion and larger than a diameter of the hole through the wall of the metal pipe.

* * * * *